United States Patent Office 2,989,567
Patented June 20, 1961

2,989,567
PROCESS FOR THE PRODUCTION OF OLEFINIC CARBINOLS
Morton W. Leeds, Union, and Robert J. Tedeschi, Whitehouse Station, N.J., assignors to Air Reduction Company, Incorporated, New York, N.Y., a corporation of New York
No Drawing. Filed Dec. 12, 1957, Ser. No. 702,229
5 Claims. (Cl. 260—631)

This invention relates to a novel process for the manufacture of olefinic carbinols of high purity in high yields. More particularly, the instant invention concerns an improved process for the production of olefinic carbinols from corresponding acetylenic carbinols involving the selective semi-hydrogenation of the acetylenic carbinols and the isolation of product olefinic carbinols in high purity and yield.

Heretofore, olefinic carbinols have been produced by the liquid phase hydrogenation of the corresponding acetylenic carbinols in the presence of a suitable hydrogenation catalyst such, for example, as a palladium catalyst. Such a prior art process is disclosed in the U.S. patent to Smith, Patent No. 2,516,826. Prior semi-hydrogenation procedures were substantially non-selective, however, while prior techniques employed in isolating the product olefinic carbinols were expensive, time consuming, and not applicable to the isolation of both high and low molecular weight carbinols. Simple isolation techniques such as fractional distillation are ineffective because of the close boiling ranges of the tertiary olefinic carbinols and corresponding non-hydrogenated tertiary acetylenic carbinols, and the fact that these carbinols form azeotropic mixtures inseparable even with high plateage fractionating columns. Various complicated separation techniques have been attempted such, for example, as the azeotropic distillation method disclosed by Smith. This method, however, is not suitable for isolation of higher molecular weight olefinic carbinols.

Accordingly, it is an object of this invention to provide a novel process for the production of olefinic carbinols of high purity in high yields. More particularly, it is an object of this invention to provide a novel process for the production of olefinic carbinols of high purity in high yields by the selective semi-hydrogenation of the corresponding acetylenic carbinols. Yet, a further object of this invention is to provide a novel method for the production of tertiary olefinic carbinols, including both low and high molecular weight carbinols, of high purity in high yields.

It has been found that an olefinic carbinol can be produced in high purity and yield by subjecting the corresponding acetylenic carbinol to selective semi-hydrogenation in the presence of an alkaline material and a palladium, platinum, or rhodium hydrogenation catalyst, subsequently decomposing minor quantities of unreacted acetylenic carbinol which remains in admixture with the olefinic carbinol into readily separable decomposition products by heating in the presence of alkaline material, and isolating product olefinic carbinol in high purity and yield. The use of an alkaline material during the semi-hydrogenation of the acetylenic carbinol promotes the selectivity of the hydrogenation to the desired olefinic carbinol product while substantially suppressing competitive further hydrogenation and the formation of undesirable saturated carbinols. After completion of the selective semi-hydrogenation, a minor quantity of unreacted acetylenic carbinol which remains in admixture with the olefinic carbinol is subjected to base cleavage by heating in the presence of alkaline material whereby the acetylenic carbinol decomposes to form acetylene and a carbonyl compound which are readily separated from the olefinic carbinol. Preferably, the alkaline material used in the hydrogenation step is permitted to remain in the resulting hydrogenation mixture to act as catalyst in the subsequent base-catalyzed decomposition of unreacted acetylenic carbinol.

The platinum, palladium or rhodium hydrogenation cataylst is preferably supported on a suitable nonacidic carrier such as $BaCO_3$, $CaCO_3$, $BaSO_4$, charcoal, and the like. Less preferably, the carrier may be eliminated and the catalyst dispersed directly in the reaction medium with or without solvent.

When less active catalyst carriers such as $BaCO_3$, $CaCO_3$ and $BaSO_4$ are employed to support the hydrogenation catalyst, the semi-hydrogenations carried out in accordance with the invention in the presence of alkaline material halt selectively after reduction of the acetylenic carbinol to olefinic carbinol. With more active carriers such as charcoal, faster reaction rates are obtained and the reaction, although equally selective in the reduction of the acetylenic carbinol to olefinic carbinol, does not halt after selective reduction of the acetylenic carbinol to olefinic carbinol but must be manually halted.

Any alkaline material which will effect selective semi-hydrogenation and cause the decomposition of unreacted acetylenic carbinol without deleteriously affecting the desired olefinic alcohol may be used in accordance with this invention. Examples of materials suitable for this purpose are the alkali metals such, for example, as potassium, sodium, lithium, cesium, and rubidium, and the hydroxides and alcoholates of these alkali metals.

The present invention is especially applicable to the semi-hydrogenation of tertiary ethynyl (acetylenic) carbinols of the type

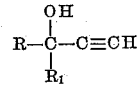

wherein R and $R_1$, respectively, designate the same or a different alkyl, cycloalkyl, or aryl group. Examples of such tertiary acetylenic carbinols are 3-methyl-1-butyn-3-ol, 3-methyl-1-pentyn-3-ol, 3,5-dimethyl-1-hexyn-3-ol, 3-ethyl-5-methyl-1-heptyn-3-ol, 3-methyl-1-nonyn-3-ol, 3-ethyl-1-nonyn-3-ol and ethynyl cyclohexanol.

As above indicated, it is generally preferable to employ palladium, platinum or rhodium catalyst supported upon a suitable non-acidic carrier. Usually supported catalysts wherein the catalyst comprises a minor proportion, e.g., about 2–25% by weight of the total weight of the catalyst and support are suitably used. For example, supported catalysts comprising 5% by weight of catalyst can advantageously be employed.

In general, in the semi-hydrogenations conducted in accordance with the invention, the alkaline material is preferably employed in an amount of about 15–50 parts per part of palladium, platinum, or rhodium metal catalyst, while the metal catalyst is preferably employed in amounts ranging from about 0.0025 to 0.1 g. metal catalyst per mole of acetylenic carbinol. Thus, when using a supported catalyst comprising 5% by weight of metal catalyst, an effective range of proportions would be 0.38 g. to 0.11 g. of alkaline material per 0.15 g. of supported catalyst (5% catalyst) per mole of acetylenic carbinol, and 0.75 g. to 0.22 g. of alkaline material per 0.30 g. of supported catalyst (5% catalyst) per mole of acetylenic carbinol. It is preferred that generally larger amounts of catalyst be used for carbinols having a longer chain length than for shorter chain carbinols. Accordingly, for carbinols having a chain length greater than dimethyl hexynol, it is preferred that amounts of supported catalyst (5% catalyst) in the range of 0.3 to 1.0 g. per mole of acetylenic carbinol be used.

The amount of alkaline material employed in the invention to promote decomposition of the unreacted acetylenic carbinol is generally about the same as that employed during the semi-hydrogenation as described above. In preferred practice of the invention, the alkaline material and metal catalyst used in the semi-hydrogenation are permitted to remain in the reaction mixture during subsequent heating of the reaction products to promote decomposition of unreacted acetylene carbinol. Alternatively, however, the catalyst and any alkaline material adsorbed thereon can be filtered from the hydrogenation reaction mixture prior to the base cleavage. If necessary, additional alkaline material can be added to replace alkaline material removed with the catalyst so that sufficient alkaline material is present to promote acetylenic carbinol decomposition during subsequent treatment.

In carrying out the present invention, it is necessary that the semi-hydrogenation be carried out in the presence of alkaline material and that the minor amounts of unreacted acetylenic carbinol remaining after the semi-hydrogenation be decomposed in the presence of alkaline material in order that olefinic carbinols be obtained in high purity and yield. The following are illustrative of the advantageous results obtained through practice of the present invention as compared to results obtained through practices not in accordance with the invention.

The semi-hydrogenation of methyl pentynol in the absence of alkaline material at 27–30° C. gives a distilled vinyl carbinol of only 88.3–89.0% purity, containing 4.2–4.4%, respectively, of unreacted acetylene and saturated carbinol. Hydrogenation in the presence of KOH, followed by base cleavage at 100–110° C. (2 hours) results in a product of 94.8–98.0% purity. When KOH is omitted from the hydrogenation, but employed for base cleavage the purity of methyl pentenol is 91.0% (free of acetylenic).

The role of the alkaline material becomes more important with increasing chain length of the acetylenic carbinol. The preparation of methyl nonenol in the absence of base gives a distilled product of only 83.3 to 85.4% purity containing 3.5–6.4%, respectively, of unreacted acetylenic and saturated carbinol. The base protected hydrogenation gives 95.1 to 95.5% pure methyl nonenol free of acetylenic. Similar results are obtained with vinyl cyclohexanol and dimethyl hexenol in the absence of base (purity 82.4% and 87.1%, respectively). In the presence of base, satisfactory purities of 95–96% or above are again obtained.

In practice of the invention, the semi-hydrogenation is generally carried out at a temperature in the range of about 25 to 45° C. and preferably 25 to 30° C. with lower reaction temperatures being more desirable with lower acetylenic carbinols than the higher carbinols. For example, the semi-hydrogenation of methyl pentynol at temperature ranges of 35–40° C. and 30–38° C. using palladium on charcoal catalyst gave lower purities (88–89%) than that obtained at 25–30° C. (96.6%). All hydrogenations were conducted in the presence of KOH. On the other hand, semi-hydrogenation of higher carbinols at 35–40° C. such, for example, as methyl nonynol and ethynyl cyclohexanol gave purities of 96–97%. Platinum on neutral charcoal is also suitably used in the practice of the invention. It has been found that when the catalyst carrier is of the less active type such, for example, as calcium carbonate or barium sulfate preliminary heating for 15–20 minutes at 45–50° C. is sometimes necessary to activate the hydrogenation. Once the reduction has started, however, the temperature can generally be lowered to 30° C. and still give a reasonable rate. In general, the semi-hydrogenation is carried out, at pressures in the range of 20 to 200 p.s.i.g. and preferably 30 to 55 p.s.i.g.

If so desired, the reaction may be carried out in the absence of a solvent. If a solvent is used it should be of such nature that it is inert with respect to the reactants or the products formed in the course of the reaction and readily fractionated from the desired product. Examples of suitable solvents are n-hexane and petroleum ether.

As above indicated, semi-hydrogenations which are carried out in the presence of alkaline material wherein the hydrogenation catalyst is supported on a less active carrier such as $CaCO_3$, $BaCO_3$, and $BaSO_4$ selectively halt after substantially complete reduction of the acetylenic carbinol to the olefinic carbinol without substantial further hydrogenation to the saturated carbinol. Where active carriers such as charcoal are employed, it is necessary to halt the reaction after about the theoretical amount of hydrogen necessary to reduce the acetylenic carbinol to the olefinic carbinol has reacted in order to avoid the formation of substantial amounts of saturated carbinols since the hydrogenations carried out in the presence of such active carriers do not selectively stop after complete semi-hydrogenation. The semi-hydrogenations wherein active catalyst support such as charcoal is employed are conveniently stopped after a hydrogen pressure drop corresponding to reaction of about the theoretical amount of hydrogen necessary to reduce the acetylenic carbinol to the olefinic carbinol. Alternatively, samples of the reaction mixture can be analyzed periodically for the presence of acetylenic carbinol and the reaction stopped when such tests indicate that substantially all of the acetylenic carbinol is reacted.

As indicated heretofore, after the formation of the olefinic carbinol, the resulting product is treated so as to decompose any unreacted acetylenic carbinol that may be present, thereby facilitating the separation and isolation of the desired tertiary olefinic carbinol.

At elevated temperatures, alkaline material as above described catalyzes decomposition of acetylenic carbinols, cleaving said carbinols to acetylene and lower boiling and easily separated aldehydes or ketones. In general, the decomposition of the unreacted tertiary carbinol is carried out at a temperature in the range of 85° C. to 170° C., and preferably 90° C. to 120° C. and at a pressure in the range of 0 to 200 p.s.i.g., and preferably at substantially atmospheric pressure.

The following general procedure is illustrative of that which may be used for producing tertiary olefinic carbinols from tertiary acetylenic carbinols and the separation and isolation thereof.

In carrying out the hydrogenation, a Parr Shaker apparatus is employed (1.0 mole $H_2$ equivalent to 85 p.s.i. at 30–55 p.s.i.g.)

REACTION CHARGE 1 mole tertiary acetylenic carbinol (98–100% assay)
100 cc. n-hexane
0.15 g. palladium (5%) on charcoal or barium carbonate
0.30 g. powdered KOH The powdered KOH is dissolved in the acetylenic carbinol at 30–40° C. with stirring during several minutes. The resulting clear to slightly yellow solution is transferred quantitatively with solvent (hexane) rinses to a jacketed copper-stainless steel hydrogenation vessel equipped with a thermometer well into which is placed a Weston dial thermometer.

The reaction temperature is adjusted to 25–30° C. and maintained in this range during the hydrogenation. The hydrogenation is exothermic, and occasional water cooling is necessary. However, prolonged use of the cooling water should be avoided, since the resultant temperature drop results in a slower rate of hydrogenation which may influence the reduction adversely. The theoretical pressure drop of 85 p.s.i. is reached in 45–150 minutes depending on the catalyst and starting material. Hydrogenations in the presence of alkaline material where a less active carrier such as barium carbonate is employed halt automatically at an 85–87 p.s.i. drop, but similar hydrogenations employing an active carrier such as charcoal must be halted manually at about the theoretical pressure drop.

The hydrogenation mixture is then transferred with solvent rinses to a distilling flask and solvent flashed off to a pot temperature of 90–120° C. The product is held at this temperature for two hours to decompose unreacted acetylenic carbinol into ketone and acetylene.

The reaction mixture is then filtered to separate the catalyst, and fractionated through a 25 plate, heated, Podbielniak packed column at atmospheric pressure or a 15 plate, heated column under vacuum. In the case of the higher boiling carbinols such as 3-ethyl-5-methyl-1-heptene-3-ol, 3-methyl-1-nonene-3-ol, and 1-vinyl cyclohexan-1-ol vacuum distillation at 25–50 mm. through a 15 plate column is preferable. The vinyl carbinols studied were collected over a two degree range, with resultant purities of 95–97.8%.

Following the above outlined procedures, a number of acetylenic carbinols were semi-hydrogenated under the reaction conditions, listed in the following Table I. The results obtained are also recorded in said Table I.

Using a 35 to 45 plate column with a good reflux ratio (4:1) purities two to three percent higher can be obtained.

Fr. III; $N_D^{20}$, 1.4166.

EXAMPLE 17.—3-METHYL-1-PENTEN-3-OL (1.0 M EXAMPLE 4)

| Fr. | B.P. | mm. | Percent | | | Gms. |
|---|---|---|---|---|---|---|
| | | | Ketone | C≡C-ol | CH=CH-ol | |
| I | 65–75 | Atm. | | | | |
| II | 75–115 | Atm. | 0 | 0 | 56.1 | 6 |
| III | 115–116 | Atm. | 0 | 0 | 96.4 | 85 |

Fr. III; $N_D^{20}$, 1.4287.

Table I.—Tertiary vinyl-carbinols

| Example No. | Starting Material | Grams Moles | Reaction Conditions | | Supported (5%) Cat., g. | KOH, g. | Purity, C=C-ol | Percent Product Analysis | | Yield Conv. |
|---|---|---|---|---|---|---|---|---|---|---|
| | | | Temperature, °C. | Time (Mins.) | | | | Impurities | | |
| | | | | | | | | Ketone | —C≡CH-ol | |
| 1 | MB [1] | 168 g. 2.0 m. | 28–30 | 193 | Pd-C, 0.60 | 0.60 | 94.6 | 0 | 0 | 76.5 |
| 2 | MP [2] | 98 g. 1.0 m. | 27–33 | 85 | Pd-C, 0.15 | 0.30 | 94.8 | 0.86 | 0 | 82.0 |
| 3 | MP [2] | 98 g. 1.0 m. | 27–31 | 102 | Pd-C, 0.15 | 0.30 | 96.6 | 1.5 | 0 | 79.0 |
| 4 | MP [2] | 98 g. 1.0 m. | 28–30 | 52 | Pd-C, 0.30 | 0.30 | 96.4 | 0 | 0 | 85.0 |
| 5 | MP [2] | 98 g. 1.0 m. | 30–35 | | Pd-BaSO₄, 0.15. | 0.30 | 98.0 | 0 | 0 | 77.0 |
| 6 | MP [2] | 98 g. 1.0 m. | 30–35 | 165 | Pd-C, 0.15 | [8] 0.21 | 94.2 | 0 | 0 | 86.0 |
| 7 | MN [3] | 115.5 g. 0.75 m. | 35–45 | 34 | Pd-C, 1.0 | 1.0 | 95.1 | 1.3 | 0 | 92.3 |
| 8 | MN [3] | 154 g. 1.0 m. | 27–30 | 102 | Pd-BaCO₃, 0.15. | 0.30 | 95.5 | 0 | 0 | 85.2 |
| 9 | ECH [4] | 124 g. 1.0 m. | 38–40 | 74 | Pd-C, 1.0 | 1.0 | 97.8 | 1.8 | 0 | 85.0 |
| 10 | ECH [4] | 124 g. 1.0 m. | 27–30 | 109 | Pd-BaCO₃, 0.15. | 0.30 | 95.7 | 1.1 | 0 | 81.0 |
| 11 | ECH [4] | 124 g. 1.0 m. | 27–30 | 150 | Pd-C, 0.15 | [9] 0.30 | 95.6 | 0.57 | 0 | 81.5 |
| 12 | DH [5] | 126 g. 1.0 m. | 28–32 | 89 | Pd-C, 0.15 | 0.30 | 95.3 | 1.5 | 0 | 88.3 |
| 13 | DH [5] | 126 g. 1.0 m. | 25–45 | 240 | Pd-BaCO₃, 0.15. | 0.30 | 99.3 | 0 | 0 | 82.2 |
| 14 | EMH [6] | 154 g. 1.0 m. | 27–30 | 99 | Pd-C, 0.15 | 0.30 | 93.6 | 3.9 | 0 | 88.5 |
| 15 | PB [7] | 146.7 g. 1.0 m. | 33–40 | 90 | Pd-BaCO₃, 0.15. | 0.30 | 95.0 | 0.05 | 0 | 83.8 |

[1] MB—3-methyl-1-butyn-3-ol.
[2] MP—3-methyl-1-pentyn-3-ol.
[3] MN—3-methyl-1-nonyn-3-ol.
[4] ECH—1-ethynyl (vinyl) cyclohexan-1-ol.
[5] DH—3,5-dimethyl-1-hexyn-3-ol.
[6] EMH—3-ethyl-5-methyl-1-heptyn-3-ol.
[7] PB—3-phenyl-1-butyn-3-ol.
[8] K.
[9] NaOH.

The following Examples 16–18 are results of data physical constants, boiling point data and indices of refraction of the tertiary olefinic carbinols prepared and isolated in Examples 1, 4 and 7, respectively. Atmospheric pressure distillations were carried out through a 25 plate, heated, well insulated column of low hold up. Vacuum distillations were carried through a 15 plate column of similar design.

EXAMPLE 16.—3-METHYL-1-BUTEN-3-OL (2.0 M EXAMPLE 1)

| Fr. | B.P. | mm. | Percent | | | Gms. |
|---|---|---|---|---|---|---|
| | | | Ketone | C≡C-ol | CH=CH-ol | |
| I | 35–80 | Atm. | 3.2 | 0 | 18.0 | 73 |
| II | 80–95 | Atm. | 7.0 | 0 | 90.6 | 14 |
| III | 96–98 | Atm. | 0 | 0 | 94.6 | 124 |

EXAMPLE 18.—3-METHYL-1-NONEN-3-OL (0.75 M EXAMPLE 7)

| Fr. | B.P. | mm. | Percent | | | Gms. |
|---|---|---|---|---|---|---|
| | | | Ketone | C≡C-ol | CH=CH-ol | |
| I | 60–75 | (¹) | | | | |
| II | 83.5–84 | 10 | 2.0 | 0 | 95.7 | 36 |
| III | 84–84.5 | 10 | 1.0 | 0 | 96.4 | 38 |
| IV | 84.5 | 10 | 0.9 | 0 | 93.2 | 34 |

¹ Atm. P.

The product can also be satisfactorily distilled at 123–125° C. at 49 mm.

Fr. IV; $N_D^{20}$, 1.4419.

In accordance with the present invention, the hydrogenation is preferably continued until nearly all of the tertiary acetylenic carbinol has been hydrogenated. This point may be ascertained by periodically withdrawing samples from the hydrogenation chamber and testing the hydrogenated liquid by known methods for the presence of compounds containing an acetylenic linkage.

Hydrogenations carried out on a large scale are suitable for systematic sampling during the reduction. By means of a small exit line on the bottom of the hydrogenator samples can be removed at various time intervals during the hydrogenation. The course of the hydrogenation can then be readily determined by comparing the percent total hydrogen reacted obtained (from the known pressure drop) with the ethynyl hydrogen and vinyl content of the reaction mixture. The filtered sample can be quickly analyzed by the control laboratory by the standard $AgNO_3$—C≡CH and vinyl-bromination methods. The hydrogenation is effectively halted during this time with the stirrer off.

In the absence of solvent, the hydrogenation mixture is heated in the presence of alkaline material at 100–120° C. for two hours under a reflux condenser or distillation head. This step is again quite suitable for control testing. By removing small aliquots at various time intervals, qualitative ethynyl-hydrogen tests can be carried out. The heating is halted when a negative —C≡CH test is obtained. It is preferable to carry out the cleavage reaction be necessary to add additional KOH. If solvent is employed in the hydrogenation it should be flashed over before filtration from catalyst, since some of the KOH remains adsorbed on the charcoal carrier otherwise it may (Vigreux or column) until a pot temperature of 100° C. is reached, before actual C≡CH tests are carried out.

The finished vinyl carbinol is analyzed for vinyl carbinol and ketone content. Ethynyl hydrogen analysis is unnecessary if previously systematically determined. Refractive index or boiling point are not accurate criterions of purity since, the acetylenic, olefinic and saturated carbinols have very similar properties, and result in azeotropic mixtures.

The undernoted Examples 19 and 20 were prepared to determine if the lower acetylenic carbinols underwent significant base cleavage at 30° C. during typical hydrogenation conditions.

An accurately weighed sample of either methyl butynol or methyl pentynol at 30° C. placed in a tared glass stoppered flask was treated with powdered KOH, stoppered and gently shaken to solution in a thermostated water bath. The reaction mixture after specified time intervals was analyzed for the appearance of ketone in the reaction mixture. The amount of base used per mole of carbinol was equivalent to 1.0 g. (MP) and 0.30 g. (MB) as used commonly in the hydrogenations.

Table II

| Example | Compound | Grams | | T., °C. | Time, Hours | Percent Ketone Formed |
|---|---|---|---|---|---|---|
| | | Carbinol | KOH | | | |
| 19 | Methyl butynol | 24.5 | 0.25 | 35 | 2 | 0.13 |
| 20 | Methyl pentynol | 21.0 | 0.075 | 35 | 1 | 0 |

The above results in Table II show that base cleavage at 30° C. during a typical hydrogenation is negligible. Since the above experiments were carried out with the least stable members of the series, the higher less reactive acetylenic carbinols would be expected to show greater base stability at somewhat higher temperatures. In fact methyl nonynol (1.0 m.) was hydrogenated in the presence of 1.0 g. KOH at 35–45° C. and still gave a high yield (92%) of vinyl carbinol (95% purity).

Both methyl butenol and methyl nonenol were found essentially unchanged by heating with KOH at elevated temperatures. Under the same conditions methyl nonynol is completely decomposed as shown by the results below recorded in Table III:

Table III

| Example | Compound | KOH, g. | Temp., °C. | Time, Hours | Purity | |
|---|---|---|---|---|---|---|
| | | | | | Initial | After KOH |
| 21 | Methyl nonenol (20 g.) | 0.50 | 130–190 | 4 | 95.8 | 95.5 |
| 22 | Methyl butenol (50 g.) | 1.0 | 95 | 4 | 95.7 | 95.9 |
| 23 | Methyl nonynol (50 g.) | 1.0 | 130–190 | 4 | 97.2 | 0 |

From the foregoing disclosure, it is seen that this invention provides a novel process for the production of tertiary olefinic carbinols of high purity in good yields by the semi-hydrogenation of their corresponding tertiary acetylenic carbinols.

Although the present invention pertains primarily to the semi-hydrogenation of tertiary olefinic carbinols; it should be realized that the principles of the invention are applicable to the semi-hydrogenation of primary and secondary-carbinols.

The invention in its broader aspects is not limited to the specific steps, methods, compositions, combinations and improvements described but departures may be made therefrom within the scope of the accompanying claims without departing from the principles of the invention and without sacrificing its chief advantages.

It is claimed:

1. A process for producing a tertiary olefinic carbinol in high purity and yield from its corresponding tertiary acetylenic carbinol comprising contacting said tertiary acetylenic carbinol with hydrogen in the presence of a hydrogenation catalyst selected from the group consisting of palladium, platinum and rhodium and an alkaline material selected from the group consisting of alkali metals, alkali metal hydroxides and alkali metal alcoholates in an amount from about 15 to about 50 parts by weight per part of catalyst at a temperature and under pressure conditions effecitve to form the desired tertiary olefinic carbinol with said temperature being sufficiently low to suppress decomposition of free acetylenic carbinol, heating the resulting product in the presence of an alkaline material selected from the group consisting of alkali metals, alkali metal hydroxides and alkali metal alcoholates at a temperature in the range of 85 to 170° C. and a pressure in the range of 0 to 200 p.s.i.g., and recovering said tertiary olefinic carbinol.

2. A process for producing a tertiary olefinic carbinol in high purity and yield from its corresponding tertiary acetylenic carbinol comprising contacting said tertiary acetylenic carbinol with hydrogen in the presence of a hydrogenation catalyst selected from the group consisting of palladium, platinum and rhodium supported on a non-acidic carrier and an alkaline material selected from the group consisting of alkali metals, alkali metal hydroxides and alkali metal alcoholates in an amount from about 15 to about 50 parts by weight per part of catalyst, at a temperature in the range of 25 to 45° C. and a pressure in the range of 20 to 200 p.s.i.g., to form the desired tertiary carbinol, heating the resulting product in the presence of an alkaline material selected from the group consisting of alkali metals, alkali metal hydroxides and alkali metal alcoholates at a temperature in the range of 85 to 170° C. and a pressure in the range of 0 to 200 p.s.i.g., and recovering said teritary olefinic carbinol.

3. A process for producing a tertiary olefinic carbinol in high purity and yield from its corresponding tertiary acetylenic carbinol comprising contacting said tertiary acetylenic carbinol with hydrogen in the presence of a palladium catalyst supported on a non-acidic carrier and an alkali metal hydroxide in an amount from about 15 to about 50 parts by weight per part of catalyst, at a temperature in the range of 25 to 45° C. and a pressure in the range of 20 to 200 p.s.i.g., to form the desired tertiary carbinol, heating the resulting product in the presence of an alkali metal hydroxide at a temperature in the range of 85 to 170° C. and a pressure in the range of 0 to 200 p.s.i.g., and recovering said tertiary olefinic carbinol.

4. A process according to claim 3 wherein the carrier is selected from the group consisting of $BaCO_3$, $CaCO_3$, $BaSO_4$ and neutral charcoal.

5. A process according to claim 3 wherein the tertiary acetylenic carbinol is selected from the group consisting of 3-methyl-1-butyn-3-ol, 3-methyl-1-pentyn-3-ol, 3,5-dimethyl-1-hexyn-3-ol, 3-ethyl-5-methyl-1-heptyn-3-ol, 3-methyl-1-nonyn-3-ol, and 1-ethynylcyclohexanol.

References Cited in the file of this patent

UNITED STATES PATENTS

| | | |
|---|---|---|
| 2,157,365 | Vaughn | May 9, 1939 |
| 2,175,581 | Vaughn | Oct. 10, 1939 |
| 2,516,826 | Smith | July 25, 1950 |
| 2,589,275 | Naves | Mar. 18, 1952 |
| 2,681,938 | Lindlar | June 22, 1954 |
| 2,780,658 | Surmatis | Feb. 5, 1957 |

OTHER REFERENCES

Johnson: "Acetylenic Compounds," volume 1, Arnold and Co., London, The Univ. Press Aberdeen, 1946; pages 131–3, 207–8, 237.

Lindlar: Helveta Chimica Acta. volume 35, pages 446–50.

UNITED STATES PATENT OFFICE
CERTIFICATION OF CORRECTION

Patent No. 2,989,567                                            June 20, 1961

Morton W. Leeds et al.

It is hereby certified that error appears in the above numbered patent requiring correction and that the said Letters Patent should read as corrected below.

Column 3, lines 8 and 29, for "acetylene" read -- acetylenic --; column 7, lines 24 to 27, for "be necessary to add additional KOH. If solvent is employed in the hydrogenation it should be flashed over before filtration from catalyst, since some of the KOH remains adsorbed on the charcoal carrier otherwise it may" read -- before filtration from catalyst, since some of the KOH remains adsorbed on the charcoal carrier; otherwise it may be necessary to add additional KOH. If solvent is employed in the hydrogenation it should be flashed over --.

Signed and sealed this 28th day of November 1961.

(SEAL)
Attest:

ERNEST W. SWIDER                                    DAVID L. LADD
Attesting Officer                                  Commissioner of Patents